United States Patent [19]
Spencer

[11] Patent Number: 5,653,831
[45] Date of Patent: Aug. 5, 1997

[54] METHOD AND APPARATUS FOR MAKING A FILTER MODULE

[75] Inventor: Terrel F. Spencer, Lake Geneva, Wis.

[73] Assignee: Sta-Rite Industries, Inc., Delavan, Wis.

[21] Appl. No.: 545,347

[22] Filed: Oct. 17, 1995

[51] Int. Cl.⁶ .................................................... B01D 27/06
[52] U.S. Cl. .................... 156/69; 156/305; 210/493.2; 55/492
[58] Field of Search ............................. 264/261, DIG. 48; 156/69, 305, 292, 297, 304.1; 210/493.2, 493.1, 457, 232, 236; 55/492, 497, 498, 502, 510, 521

[56] References Cited

U.S. PATENT DOCUMENTS

| | | | |
|---|---|---|---|
| 2,732,031 | 1/1956 | Rabbitt et al. | 183/69 |
| 2,739,916 | 3/1956 | Parker | 154/81 |
| 2,771,156 | 11/1956 | Kasten et al. | 183/71 |
| 3,042,571 | 7/1962 | Jackson | 156/191 |
| 3,106,528 | 10/1963 | Burks | 210/496 |
| 3,144,407 | 8/1964 | Olmos | 156/69 |
| 3,164,506 | 1/1965 | Lake | 156/79 |
| 3,392,843 | 7/1968 | Mumby | 210/457 |
| 3,720,323 | 3/1973 | Landree | 210/493 |
| 3,865,919 | 2/1975 | Pall et al. | 264/DIG. 48 |
| 3,867,294 | 2/1975 | Pall et al. | 210/489 |
| 3,988,244 | 10/1976 | Brooks | 210/317 |
| 4,056,876 | 11/1977 | Lammermann | 29/469.5 |
| 4,120,711 | 10/1978 | Gudeman | 156/69 |
| 4,184,966 | 1/1980 | Pall | 210/493 B |
| 4,186,099 | 1/1980 | Henschel, Jr. et al. | 210/493.1 |
| 4,256,526 | 3/1981 | McDaniel | 156/295 |
| 4,392,958 | 7/1983 | Ganzi et al. | 210/493.2 |
| 4,438,057 | 3/1984 | Sundseth | 264/46.5 |
| 4,512,892 | 4/1985 | Ganzi et al. | 210/493.2 |
| 4,522,719 | 6/1985 | Kuwajima et al. | 210/457 |
| 4,576,774 | 3/1986 | Hazard et al. | 264/267 |
| 4,588,464 | 5/1986 | Miyagi et al. | 156/218 |
| 4,663,041 | 5/1987 | Miyagi et al. | 210/493.2 |
| 4,769,096 | 9/1988 | Vander Giessen et al. | 156/69 |
| 4,861,479 | 8/1989 | Solzer | 210/485 |
| 4,890,444 | 1/1990 | Vander Giessen et al. | 55/498 |
| 4,925,601 | 5/1990 | Vogt et al. | 264/6 |
| 4,956,089 | 9/1990 | Hurst | 210/484 |
| 5,017,318 | 5/1991 | Vanderbilt et al. | 264/113 |
| 5,024,870 | 6/1991 | Jackson | 428/181 |
| 5,049,326 | 9/1991 | Matsumoto et al. | 264/41 |
| 5,114,508 | 5/1992 | Miyagi et al. | 156/69 |
| 5,130,023 | 7/1992 | Feint | 210/493.2 |
| 5,143,616 | 9/1992 | Pall et al. | 210/500.38 |
| 5,152,890 | 10/1992 | Linnersten | 55/498 |
| 5,190,651 | 3/1993 | Spencer et al. | 210/305 |
| 5,230,760 | 7/1993 | Tanabe | 156/69 |
| 5,266,195 | 11/1993 | Hopkins | 210/321.74 |
| 5,273,560 | 12/1993 | Kadoya | 55/498 |
| 5,350,515 | 9/1994 | Stark et al. | 210/493.2 |
| 5,403,482 | 4/1995 | Steere et al. | 210/489 |

*Primary Examiner*—Michael W. Ball
*Assistant Examiner*—Michael A. Tolin
*Attorney, Agent, or Firm*—Jansson & Shupe, Ltd.

[57] ABSTRACT

A new method for making a filter module includes the steps of providing an adhesive dispensing implement and a support member having an annular flange. A filter medium is placed around the support member to form an intermediate assembly and the implement and the assembly are rotated relative to one another while applying adhesive to the medium and the flange, thereby securing the medium and the flange to one another. A related apparatus for making a filter module has a powered module support mechanism for rotating a filter module about an axis and an adhesive dispensing implement for applying adhesive to a rotating filter module. Preferably, the module support mechanism includes two parallel rotating bars for holding the module and the module assembly is rotated while holding the adhesive dispensing implement stationary.

13 Claims, 8 Drawing Sheets

METHOD AND APPARATUS FOR MAKING A FILTER MODULE

FIELD OF INVENTION

This invention relates generally to liquid purification and adhesive bonding and, more particularly, to a method and apparatus for making filter modules useful for filtering liquids.

BACKGROUND OF THE INVENTION

For those requiring clean liquids, e.g., water, oil and the like, the need to filter particulate matter from such liquids has long been an area of concern. And workers in the field of filter engineering have responded to those concerns by providing efficient filter devices configured to remove particulates, the size(s) of which are consistent with user needs.

Commonly, liquid filters use a porous filtering medium mounted on or held in place by some type of supporting structure. An earlier, highly-effective filter module used primarily for swimming pool applications is disclosed in U.S. Pat. No. 3,988,244 (Brooks) and a much more recent innovation in pool filters is disclosed in U.S. Pat. No. 5,190,651 (Spencer). The filter modules disclosed in the Brooks and Spencer patents (owned by Sta-Rite Industries, Inc., the leading manufacturer of pool and spa filters) include two pleated filter media mounted on a lattice-like core structure. The media and the core structure are securely bonded to one another by end caps molded thereto.

The matter of media-core bonding has been the subject of a good deal of creative effort. One approach to bonding filter elements is disclosed in U.S. Pat. No. 3,042,571 (Jackson). The method described in such patent involves placing a bead of adhesive along each of the two parallel edges of a sheet-like material from which a pleated medium is formed after adhesive application. After the medium is wrapped to cylindrical shape, its ends (which have the adhesive beads thereon) are pressed against the end caps for bonding.

A second method of bonding is described in U.S. Pat. No. 3,392,843 (Mumby) and involves a cylindrical filter cartridge having a wrapped, pleated filter medium. The method includes placing several beads of adhesive on a filter medium which is pleated but not yet wrapped around the support structure. Adhesive placement is along spaced-apart "lines" perpendicular to the edges of the pleats. After the adhesive hardens, the medium is wrapped and placed into a perforated cylindrical enclosure. The beads function to retain the medium in a slightly-spaced relationship to such enclosure.

U.S. Pat. No. 4,120,711 (Gudeman) described equipment and a process for sealing molded end caps to a filter tube by dispensing a predetermined quantity of molten adhesive into an end cap. Thereafter, a cylindrical filter cartridge is inserted into the end cap under slight pressure to embed the ends of the filter in the adhesive.

A similar approach involves using an open mold into which is placed a liquid plastisol material or molten polyurethane. Pleated media are then inserted into such material which is allowed to harden. The end caps (or "retaining plates" as they are referred to in the Brooks patent) are thereby cast in place. This approach has been used to make the filter cartridges described in the Brooks and Spencer patents.

While there is a good deal of patent literature on filter devices and how to make them, there seems to be much less information available on equipment that uses bonding techniques, especially equipment using such techniques to make filter devices—the Gudeman patent is an exception.

Another exception is U.S. Pat. No. 4,925,601 (Vogt et al.) which describes equipment used to apply viscous thermoplastic polymer to what the patent describes as a melt-blown web. The web is flat and strip-like, moves in a linear path, and the polymer is applied through elongate nozzles above the web and perpendicular to the direction of web travel. The resulting medium is said to be useful for filtering lubricating coolants.

U.S. Pat. No. 4,256,526 (McDaniel) discloses equipment that uses adhesive bonding but for making paper bags and corrugated cartons, not filters. Carton stock moves in a linear path and beads of adhesive are placed along lines parallel to the direction of stock movement. At the proper instant, adhesive is placed along a line perpendicular to such direction by using a burst from an elongate nozzle.

While known methods and equipment for making filters have been generally satisfactory, problems are not unknown. For example, urethane is relatively expensive and because of between-operation purging of urethane guns, a good deal of the product is wasted. Another difficulty attending use of liquid urethane is that precise "mix" formula is difficult to control. And urethane cures with very sharp edges which makes it necessary to hand-trim flashing and the like. In other words, filter-making processes using cast urethane tend to be somewhat wasteful and are certainly labor-intensive.

Another problem with known technology is that irrespective of whether plastisol or urethane is used, only one filter end cap can be made at a time. Urethane has about a 5 minute cure time for each end cap and neither the filter medium nor the end cap can be moved until hardening occurs.

An improved method and apparatus for making filter modules in a way which dramatically shortens manufacturing time, which uses less expensive materials and which substantially avoids the need for hand-trimming would be an important advancement in the art.

OBJECTS OF THE INVENTION

An object of the invention is to provide a new method and apparatus for making a filter module that overcome some of the problems and shortcomings of the prior art.

Another object of the invention is to provide a new method and apparatus for making a filter module by using lower-cost materials.

Another object of the invention is to provide a new method and apparatus for making a filter module which "streamlines" and shortens manufacturing time in the production cycle.

Still another objective of the invention is to provide an apparatus for making a filter module that results in uniform, consistent application of adhesive to a filtering medium and its support structure.

Another objective of the invention is to provide a method and apparatus for making a filter module that seals pleat ends by substantially eliminating gaps that otherwise form between a pleated filtering medium and its support structure.

Another objective of the invention is to provide a new method and apparatus for making a filter module that involves "staged" module manufacturing operations, e.g., module assembly and adhesive cooling.

Yet another objective of the invention is to provide a method and apparatus for making a filter module that dramatically reduces the untidiness seemingly inherent in some prior art approaches, e.g., those involving casting urethane.

Another objective of the invention is to provide a method and apparatus for making a filter module that eliminates the need to precisely control adhesive formula "mix." How these and other objects are accomplished will become apparent from the following descriptions and from the drawings.

SUMMARY OF THE INVENTION

The invention is an improvement in the method for making a filter module. Such method includes the steps of providing an adhesive dispensing implement and a support member having an annular flange. An accordion-like pleated filter medium is formed to have a pair of longitudinal edges which are secured to one another by, e.g., ultrasonic bonding, thereby forming a generally tubular medium.

Such medium is expanded and placed around the support member to form an intermediate assembly then placed with respect to an apparatus having an adhesive dispensing implement. The intermediate assembly and the implement are rotated with respect to one another while adhesive is applied to the filter medium and the flange, thereby securing them together. Most preferably, the assembly is rotated with respect to the implement.

When making larger filter modules, it is often desirable or even necessary to provide some support for filter pleats to help prevent such pleats from folding over upon one another at the module central portion, i.e., that portion between the flanges. In a more specific aspect of the method, the applying step includes applying an annular "belt" of adhesive around the medium at the central portion.

Preferably, the support member has a hollow tubular portion and an exterior locating rim and the filter medium placed around the tubular portion and in abutment with the locating rim which controls the dimension of the notch at a junction region. The junction region and notch (into which adhesive flows) are between a flange and an edge of the medium.

The notch (between the flange and the filter medium edge) and a nozzle capable of dispensing adhesive are aligned with one another, preferably by adjusting the position of the nozzle. A preferred adhesive is "hot melt" which hardens when cooled. After alignment, the intermediate assembly is rotated as adhesive is applied into the notch to bind the flange and medium together. If it is desired to diminish the time at which the completed module can be handled for, e.g., packaging for sale (and if a thermosetting adhesive such as hot melt is used), cool air is blown across the filter module to more quickly harden the adhesive.

In another embodiment of the invention, the hollow tubular portion defines a cylinder-shaped interior cavity. In this embodiment, the intermediate assembly is constructed by placing the first filter medium around the support member, and by placing a pleated second filter medium in the interior cavity. In a manner similar to that described above, the assembly is then rotated as adhesive is applied simultaneously to both media and to the flange in order to secure such media to the flange.

In a more specific version of such other embodiment, the second filter medium is placed within the support member in such a way as to define a notch between the flange and the second medium. Adhesive flows into the notch to bond the flange and second medium together.

In a highly preferred embodiment, the tubular portion has another locating rim in the interior cavity, i.e., within the tubular portion. The second filter medium is placed in the cavity in abutment with the locating rim, thereby defining the properly-dimensioned notch between the flange and a perimeter edge of the second medium.

In yet another embodiment of this invention, the intermediate assembly has a support member comprised of a tubular portion and a pair of annular flanges, one at each end of such portion. With a first filter medium around the tubular portion and a second filter medium within the tubular portion, the assembly is rotated while adhesive is applied to each medium and to each flange, thereby securing them together.

Another aspect of the invention involves an apparatus for making a filter module. Such apparatus has a powered module support mechanism for rotating an intermediate assembly about an axis, and an adhesive dispensing implement for applying adhesive to a rotating intermediate assembly. The support mechanism preferably includes a plurality of spaced drivers that both support and rotate the intermediate assembly as adhesive is being applied and the completed module after such application.

In a more specific embodiment, the filter module made by the apparatus is generally cylindrical and has a diameter and the plurality of drivers includes a pair of elongate bars spaced by a dimension less than the diameter. Additionally, the adhesive dispensing implement includes a nozzle which is mounted on a support, e.g., a flexible "gooseneck," so that the nozzle position is adjustable.

The apparatus is used in combination with an intermediate module assembly that includes a tubular portion terminated by a pair of spaced annular flanges and a filter medium extending between the flanges. In this embodiment, the filter medium and each flange define a junction region, and the adhesive dispensing implement includes a separate nozzle for dispensing adhesive at each such junction region.

DETAILED DESCRIPTION OF PREFERRED EMBODIMENTS

Figure 1:
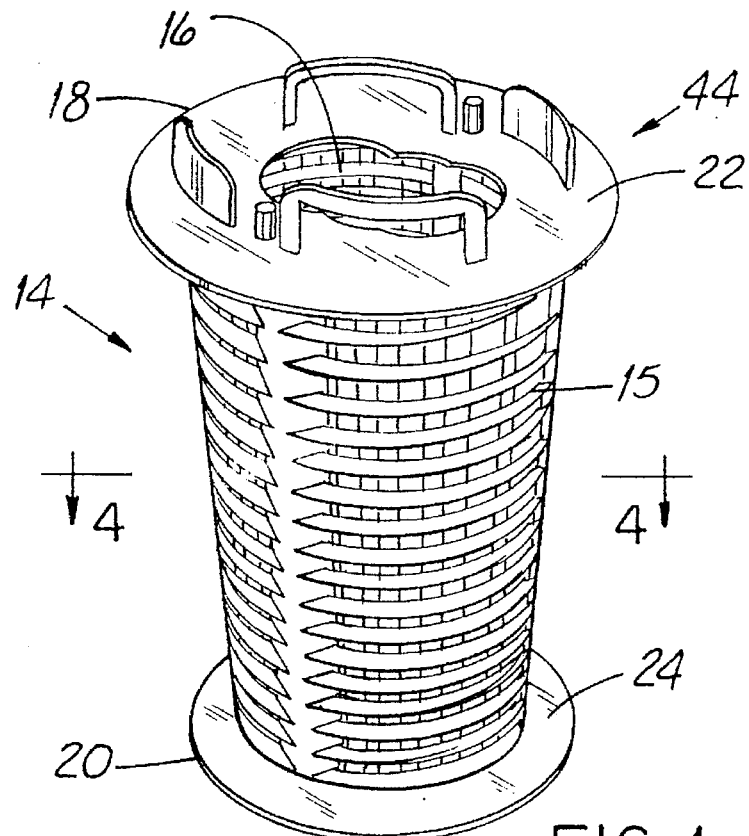
FIG. 1 is a perspective view of the intermediate assembly.

Referring to all the FIGURES and particularly to FIGS. 1, 2, 3, and 4, one type of preferred filter module 12 which may be made according to the inventive method includes a rigid support member 14 having a hollow, latticed tubular portion 15 defining a cylindrical interior cavity 16. The first and second ends 18 and 20, respectively, include respective annular first and second end flanges 22 and 24.

Figure 4:
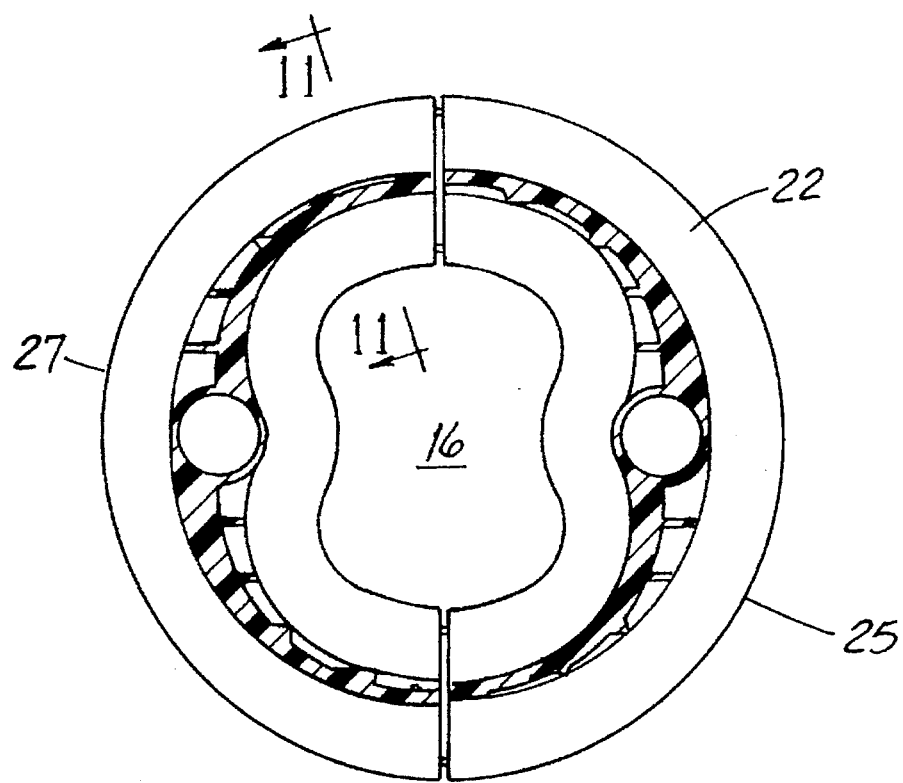
FIG. 4 is a section taken through the intermediate assembly on the line 4—4 of FIG. 1.

Annular exterior locating rims 26 and 28 are adjacent to but spaced slightly from the flanges 22 and 24, respectively. Similarly, the support member 14 has annular interior locating rims 30 and 32 adjacent to but spaced slightly from the flanges 22 and 24. As described in more detail below, the locating rims 26, 28 and 30, 32 position exterior and interior filter media 34, 36 along the long axis of the support portion 15 so that such media are about equally spaced from each end flange 22, 24. As shown in FIG. 4, a highly preferred support member is made of two half-cylinder pieces 25 and 27 which snap-fit together.

Figure 5:
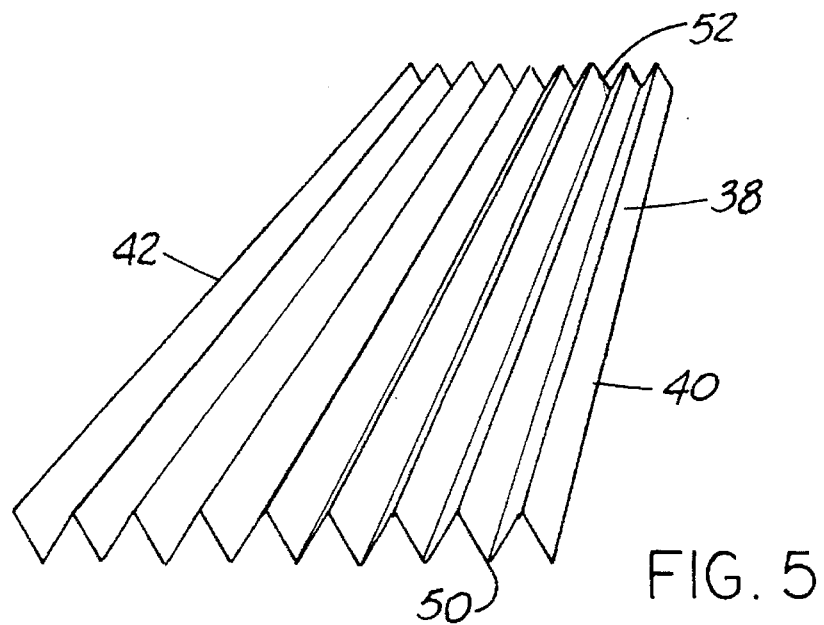
FIG. 5 is a perspective view of a sheet of pleated filter material which may be used in the construction of the filter module.
Figure 6:
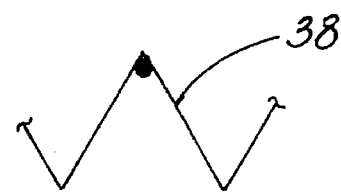
FIG. 6 is an end view of the filter material with its longitudinal edges secured together. Parts are broken away.
Figure 7:
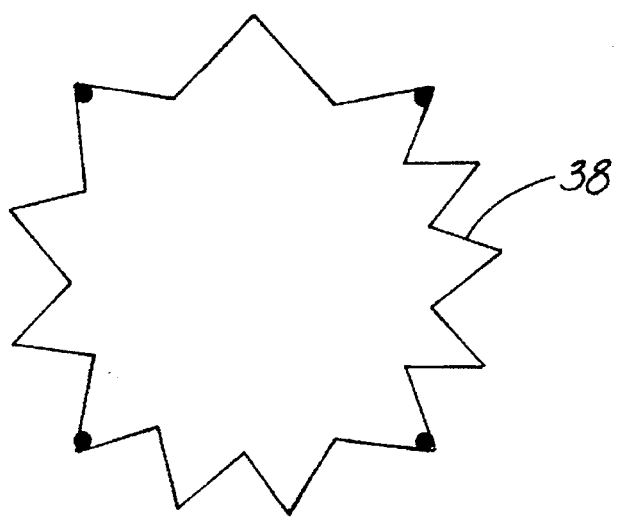
FIG. 7 is an end view of the pleated filter material shown in FIG. 5 expanded after its longitudinal ends have been secured together.
Figure 8:
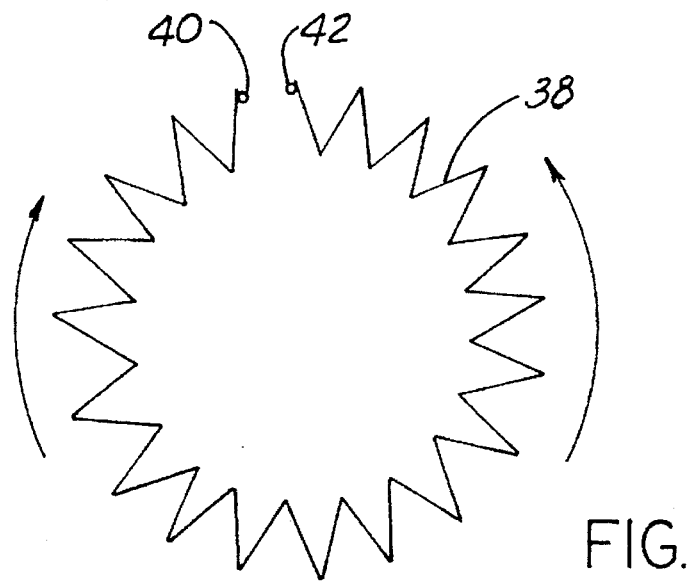
FIG. 8 is an end view of the pleated filter material shown in FIG. 5 wrapped into a tubular shape with the longitudinal ends of the material unsecured.

Referring next to FIGS. 5, 6 and 7 a pleated filter medium 38 suitable for mounting to the exterior of the tubular portion 15 is made from a cloth-like strip product fabricated specifically for use in filters. (Such strip product is known and in wide use.) The "accordion-like" medium 38 is formed to have a pair of longitudinal edges 40, 42 which (as shown in FIGS. 7 and 8) are wrapped toward and secured to one another by, e.g., ultrasonic bonding.

Figure 9:
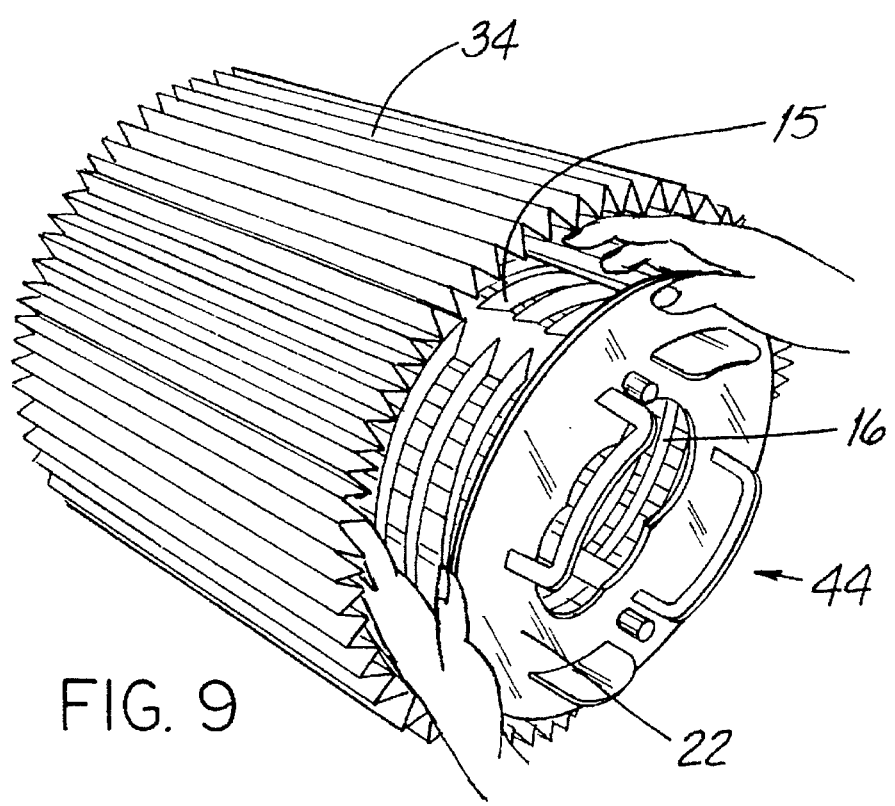
FIG. 9 is a perspective of the pleated filter material being fitted around the intermediate assembly.
Figure 2:
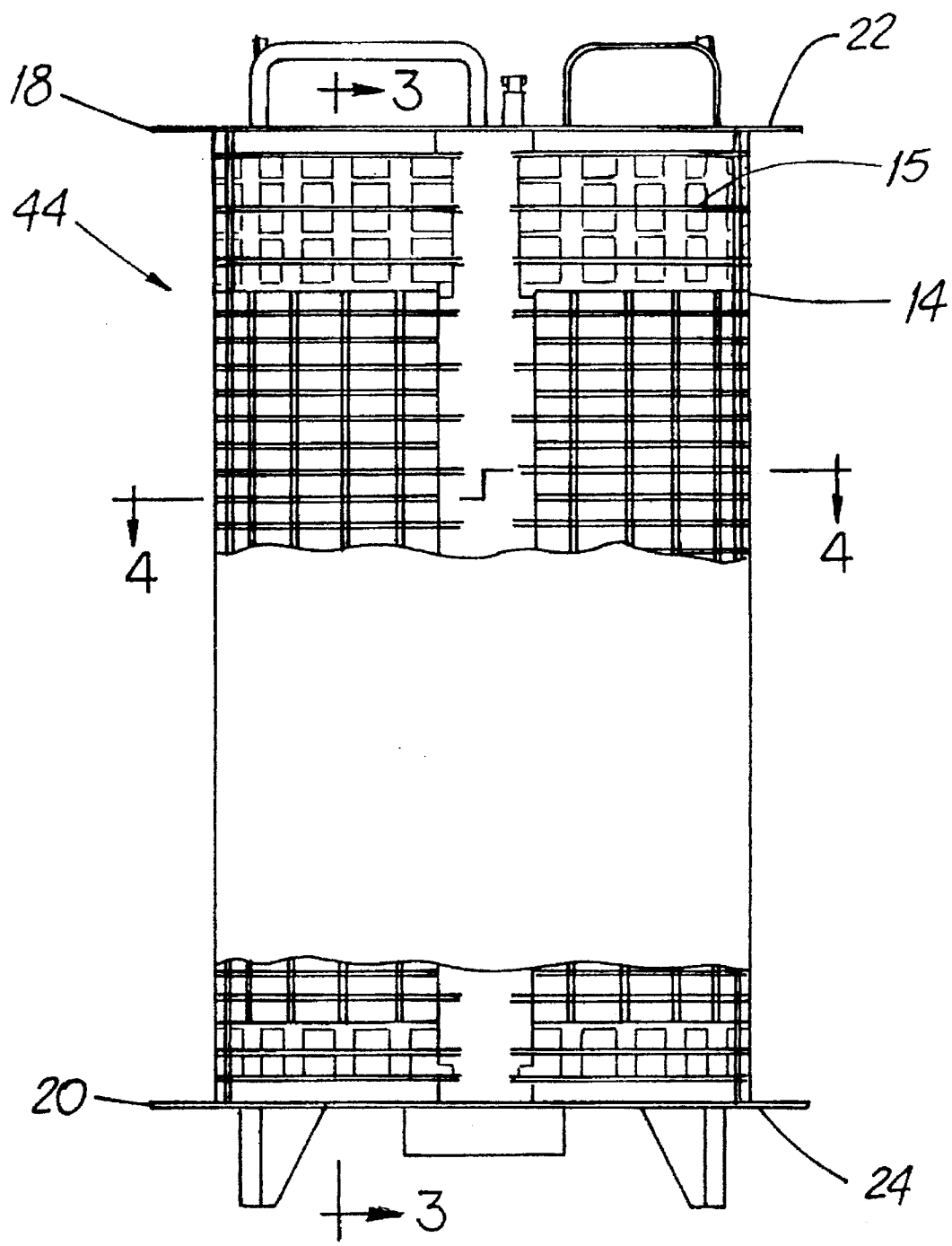
FIG. 2 is a partially cut away side view of the intermediate assembly shown in FIG. 1.
Figure 3:
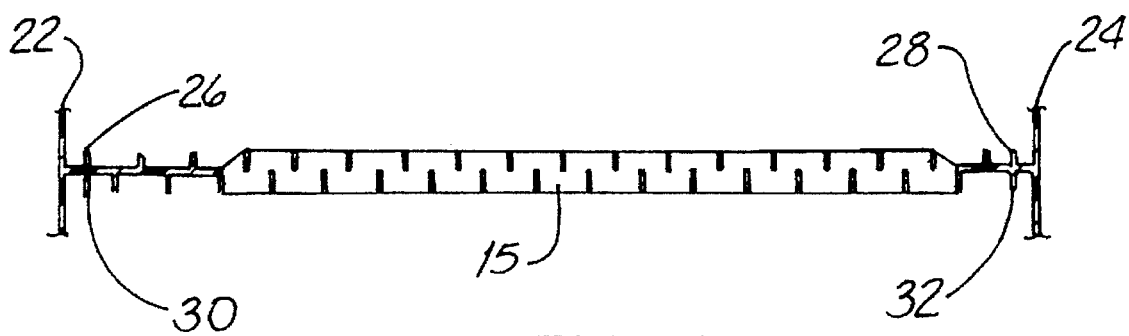
FIG. 3 is a section taken through the intermediate assembly on the line 3—3 of FIG. 2.

As shown in FIGS. 7 and 9, the tube-like medium so formed is then expanded (using the hands or expander bars or the like) to a diameter sufficiently great to permit the medium to fit around and "clear" a flange 22. Final placement of such medium 38 is with the end edges of such medium against the respective exterior locating rims 28 and 30.

Such placement forms an intermediate assembly 44 having an annular junction region 46. Each region 46 has an annular notch 48 between each end edge 18 and the adjacent annular flange 22. As described below, the new method involves flowing adhesive into each notch 48 to seal the ends of the pleats and bond the medium end edges 50 and 52 to respective flanges 22 and 24.

And an intermediate assembly 44 can also be formed in other ways. A smaller pleated second filter medium 36 is made as described and shown in FIGS. 7, 8 and 10. Such medium is then partially collapsed upon itself and placed in the interior cavity 16. Placement is in a manner such that the end edges of the medium are against the respective interior locating rims 54 and 56. As is apparent from the foregoing, each locating rim thereby controls the axial dimension of the notch 48.

Figure 11:
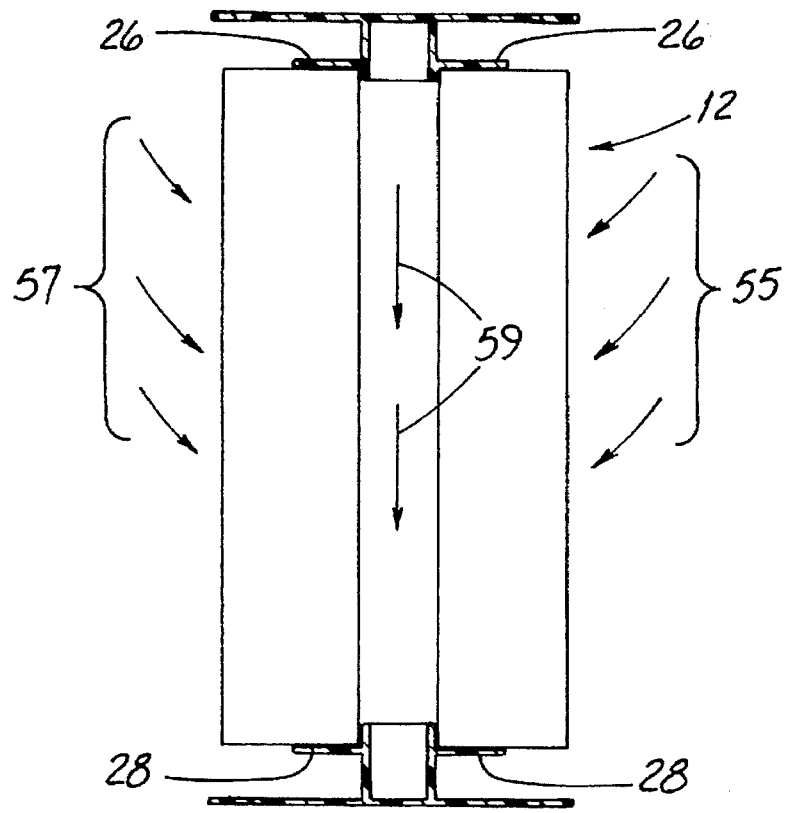
FIG. 11 is a section taken through the intermediate assembly on the line 11—11 of FIG. 4.

As used in this specification, an intermediate assembly 44 includes only the first medium 34, only the second medium 36 or (in a highly preferred embodiment) both media. As shown in FIG. 11, an advantage of using two media is that liquid to be filtered may flow radially inward as represented by the arrows 55 and may flow radially outward as represented by the arrows 57. Liquid which has passed through a medium 34 or 36 flows downward through the latticed tubular portion 15 as represented by the arrows 59. (The general principle of such a "dual-path" filter module is described in the above-noted Brooks and Spencer patents.)

Figure 10:
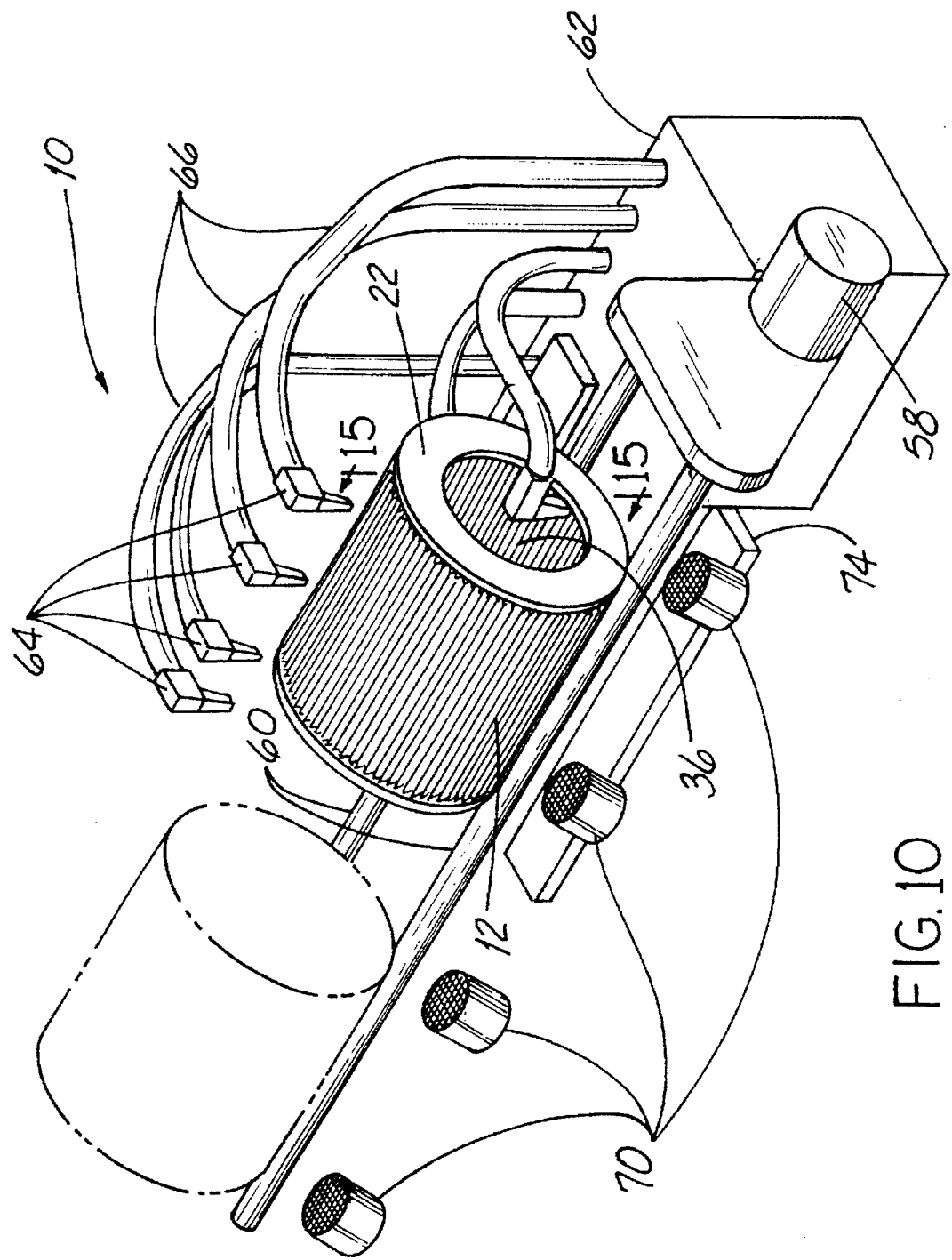
FIG. 10 is a perspective of the filter module making apparatus.
Figure 12:
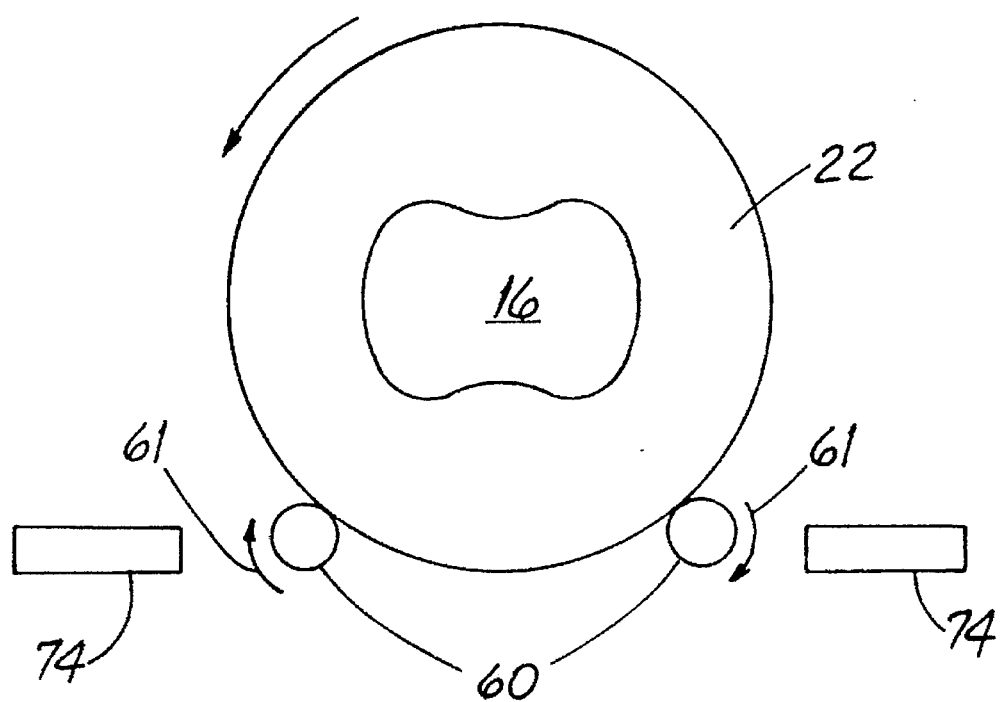
FIG. 12 is an end view of the filter module positioned on the drive bars of the filter making apparatus.

Referring next to FIG. 10, an apparatus 10 for making a filter module 12 includes a powered module support mechanism 58 for rotating the intermediate assembly 44 about its central longitudinal axis. In a highly preferred embodiment, the support mechanism 58 includes a plurality of spaced drivers 60 such as a pair of spaced elongate bars generally parallel to one another. Such drivers support the intermediate assembly 44 while adhesive is being applied. As shown in FIG. 12, the drivers 60 are powered to rotate in the same direction (as represented by the arrows 61) and, assuming such drivers 60 are the same diameter, at the same rotational speed. And the drivers 60 are spaced by a dimension D1 which is somewhat less than the diameter D2 of the intermediate assembly 44.

Such drivers 60 may be used alone or in conjunction with a table-like structure 74 having side portions and an opening therethrough in which the drivers 60 are positioned. If such a structure is employed, it provides a surface upon which intermediate assemblies 44 may be sequentially "staged" prior to placement upon the drivers 60.

Figure 13:
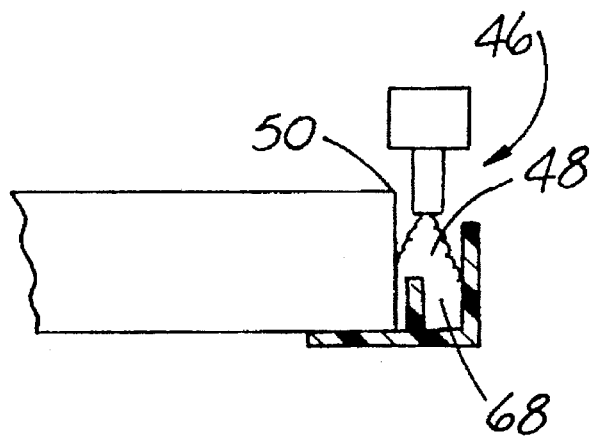
FIG. 13 is a view of the nozzle applying adhesive into the notch between the pleated filter material and the annular flange. Parts are broken away.

The new apparatus also has an adhesive dispensing implement 62, the most preferred version of which has a separate nozzle 64 for dispensing adhesive at each junction region and into each notch 48. The intermediate assembly 44 is rotated at such a speed and, as shown in FIG. 13, adhesive 68 is dispensed at such a rate that the adhesive fills the notch 48, closes the pleated ends of the medium 34 and contacts and adheres to the flange 22.

Figure 14:
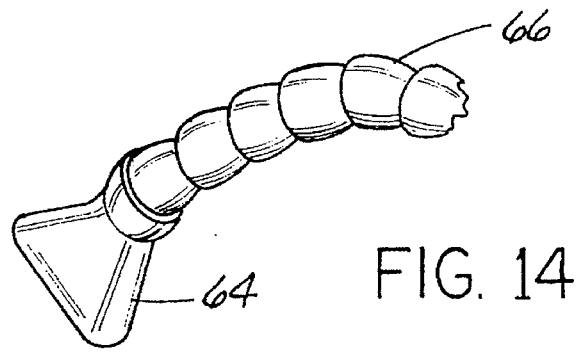
FIG. 14 is a perspective of the adhesive nozzle and the nozzle support.

For ease of adjustment when setting up the apparatus 10 to make modules 12 of a single size or to adapt the apparatus 10 to make modules 12 of differing sizes (lengths and/or diameters), each nozzle 64 is mounted on a separate nozzle support 66. Each support 66 is flexible and as shown in FIG. 14, a specific type of support 66 is often referred to as a "gooseneck" type.

If the adhesive 68 is of the hot melt type, it is preferable to include one or more cooling fans 70 for flowing air (at ambient temperature or chilled) across the module 12 to cool the adhesive 68. It is also preferred that the module 12 be rotated during cooling so that not-yet-hardened adhesive 68 does not flow out of the notches 48.

Figure 15:
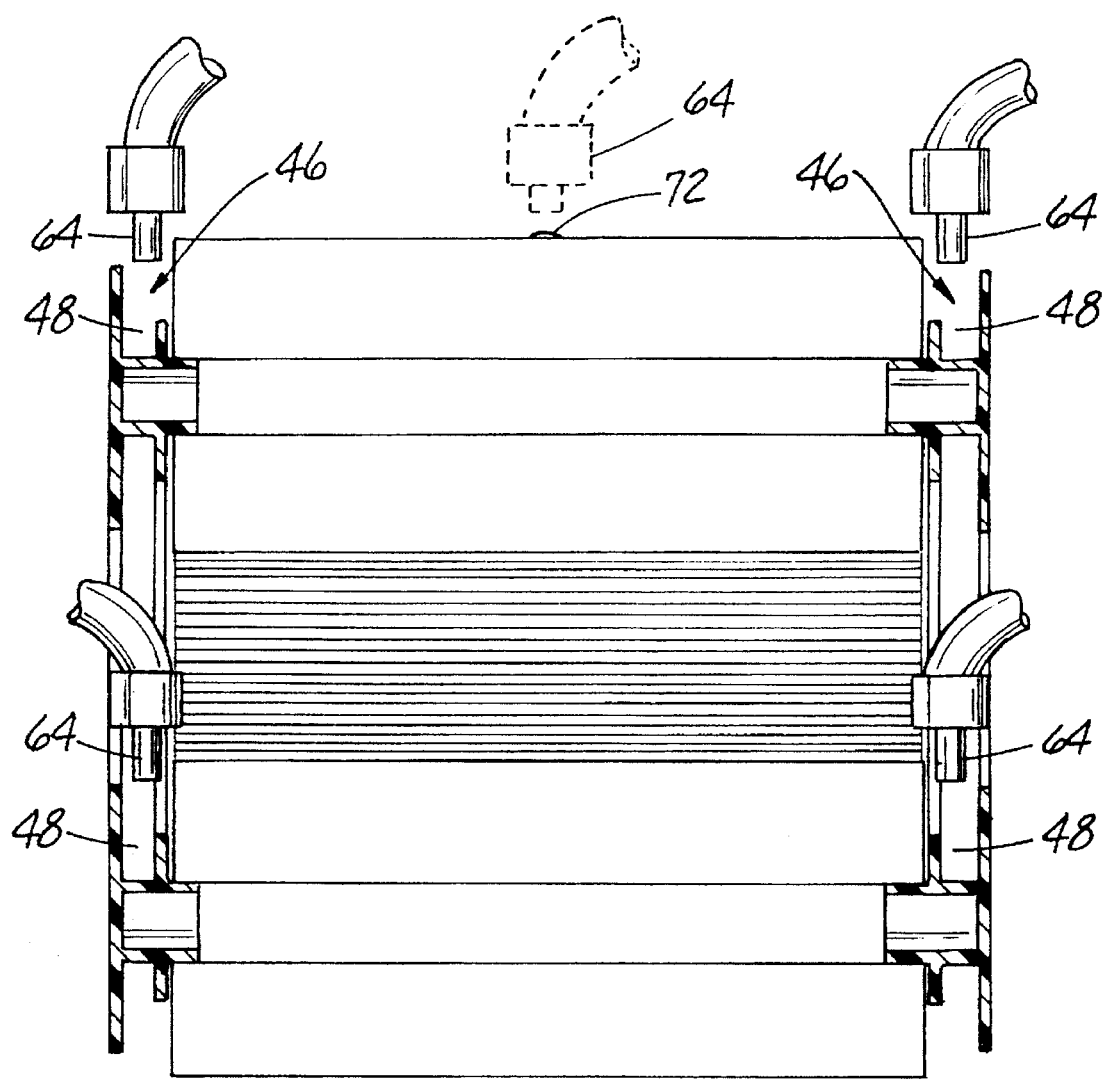
FIG. 15 is a section the filter module on the line 15—15 of FIG. 10.

In larger prior art filter modules 12, it has been the practice to wrap one or more narrow bands of nylon strip or the like around the central portion of the outer medium 34. Each such strip helps prevent pleats from folding over against one another and impairing the integrity of the module 12. In the invention, the apparatus includes a nozzle 64 positioned at the central portion as shown in FIG. 15. An annular "bead" 72 of adhesive 68 is placed around the central portion as the assembly 44 rotates. The bead 72 serves much the same purpose as a prior art strip and is much less time-consuming and costly to apply.

The new method for making the filter module 12 will now be described. Such method includes forming an accordion-like pleated filter medium 38 to have a pair of longitudinal edges 40, 42 which are secured to one another by, e.g., ultrasonic bonding, thereby forming a generally tubular medium, as shown in FIG. 7. This filter medium 38 is then expanded and placed around the support member 14 as shown in FIG. 9.

The combination of the filter medium 38 and the support member 14 forms an intermediate assembly 44 which is then placed with respect to an apparatus 10 and its adhesive dispensing implement 62. The intermediate assembly 44 and the implement 62 are rotated with respect to one another while adhesive 68 is applied to both the filter medium 38 and the flange 22, thereby securing them together. In the most preferred method, the assembly 44 is rotated with respect to the implement 62.

The notch 48 (between the flange 22 and the filter medium edge 50) and a nozzle 64 capable of dispensing adhesive 68 are aligned with one another, preferably by adjusting the position of the nozzle 64. After alignment, the intermediate assembly 44 is rotated as adhesive 68 is applied into the notch 48 to bind the flange 22 and medium 38 together.

Although many different adhesives 68 may be used in this method, the preferred embodiment involves an adhesive which is applied in a hot molten state and subsequently hardened by cooling to provide the desired seal. One specific hot melt adhesive is Uniplast MP900.

Because it may be desirable to diminish the time at which the completed module can be handled for, e.g., packaging for sale, when a thermosetting adhesive such as hot melt is used, fans 70 are positioned adjacent to the assembly 44, as shown in FIG. 10, so that cool air is blown across the filter module 12 to more quickly harden the adhesive 68. Once the adhesive 68 is hardened, the new filter module 12 is complete.

While the principles of the invention have been shown and described in connection with but a few embodiments, it is to be understood clearly that such embodiments are by way of example and are not limiting.

For example, after analyzing this specification, persons of ordinary skill in the art will recognize that the assembly 44 may be supported upon a mandrel-like structure or the like and rotated. Such persons will also recognize the possibility—perhaps less practical than the preferred method—of rotating the dispensing implement 62 and maintaining the assembly 44 stationary or rotating both the implement 62 and the assembly 44. The foregoing variants are contemplated by the invention.

What is claimed:

1. A method for making a permanently assembled filter module including the steps of:

providing an adhesive dispensing implement;

providing a support member having a pair of ends and an annular flange at each end;

placing a filter medium around the support member to form an intermediate assembly;

rotating the implement and the assembly relative to one another; and simultaneously applying adhesive to the medium and to both flanges simultaneously.

2. The method of claim 1 wherein the support member has a tubular portion and a rigid locating rim spaced from one of the flanges and the placing step includes placing the medium around the tubular portion and in abutment with the locating rim.

3. The method of claim 2 wherein the placing step is preceded by the step of:

forming a pleated medium having longitudinal edges; and securing the longitudinal edges to one another, and the placing step includes placing the pleated medium around the tubular portion by expanding the medium.

4. The method of claim 1 wherein the filter medium is placed to define a notch between the flange and the medium and the applying step includes flowing adhesive into the notch.

5. The method of claim 1 wherein the rotating step includes rotating the assembly while maintaining the implement substantially stationary.

6. The method of claim 4 wherein the rotating step includes rotating the assembly while maintaining the implement substantially stationary.

7. The method of claim 1 wherein:

the support member includes a hollow tubular portion defining an interior cavity;

the filter medium is a first filter medium;

and the method includes the step of:

placing a second filter medium in the interior cavity; and the applying step includes the step of:

simultaneously applying adhesive to the first and second media and to both flanges.

8. The method of claim 7 wherein the second filter medium is placed to define a notch between the flange and the second medium and the step of applying adhesive to the second medium and the flange includes flowing adhesive into the notch.

9. The method of claim 8 wherein the interior cavity has a rigid locating rim therein and the step of placing a second filter medium includes placing the second medium in the cavity and in abutment with the locating rim, thereby defining the notch.

10. The method of claim 11 wherein the rotating step includes rotating the assembly while maintaining the implement substantially stationary.

11. A method for making a filter module including the steps of:

providing a module support mechanism having at least one air blower adjacent thereto;

providing an assembly on the support mechanism and having (a) a tubular portion terminated by a pair of spaced annular flanges, (b) a first filter medium around the tubular portion, and (c) a second filter medium in the tubular portion;

rotating the assembly by actuating the support mechanism;

applying adhesive to each medium and to each flange; and cooling the adhesive by flowing cooling air from the air blower across the module.

12. The method of claim 11 wherein the first filter medium includes a central portion between the flanges and the applying step includes applying adhesive around the medium at the central portion.

13. A method for making a filter module including the steps of:

providing first and second adhesive dispensing implements;

providing a support member having an annular flange;

placing a filter medium around the support member to form an intermediate assembly;

rotating the implement and the assembly relative to one another;

applying adhesive from the first implement to the medium and to the flange, thereby joining the medium and the flange to one another; and simultaneously applying adhesive from the second implement to the filter medium to impart stability to such medium.

* * * * *